United States Patent Office 3,313,505
Patented Apr. 11, 1967

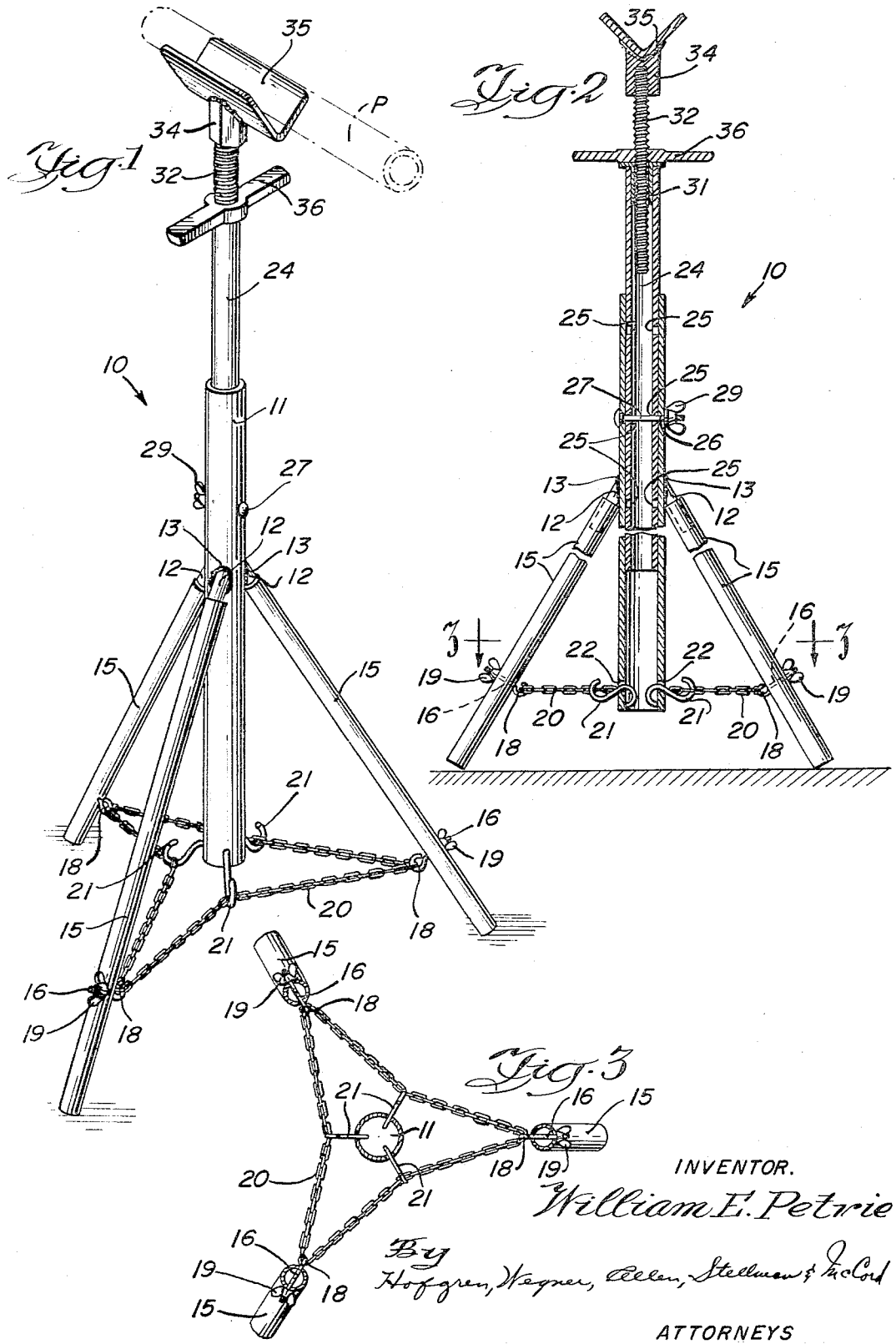

3,313,505
COLLAPSIBLE STAND
William E. Petrie, 18711 S. Cicero Ave.,
Country Club Hills, Ill. 60477
Filed May 21, 1965, Ser. No. 457,620
6 Claims. (Cl. 248—165)

This invention relates to a collapsible stand and more particularly to a collapsible stand having at least three legs.

As an example, the collapsible stand of this invention can be used by a plumber or a pipe fitter for a temporary support of the pipe or the like while he is working with it. Heretofore the devices used to support pipes had been made by the tradesmen on the job, having an all-welded construction. Such stands could not be dismantled and since they were bulky, the storage of such stands presented a great problem. As a result, stands of that type were usually discarded by the tradesmen after a specific job, for which they were used, had been completed.

Thus there is a need for a stand can be completely taken apart, quickly and easily assembled when required, and made adjustable to various necessary heights. Such a stand, when disassembled, can be easily stored in a carrying case or a work-shop and requires little space.

An object of this invention is to provide a new and improved collapsible stand for a temporary support of pipes or the like which could be completely disassembled and stored when necessary.

Another object of this invention is to provide an adjustable collapsible stand which is durable, rigid and inexpensive.

Still another object of this invention is to provide an adjustable, collapsible stand which is dependable and of light weight.

A further object of this invention is to provide a collapsible stand having an upright member with legs telescoped therefrom and an endless flexible member extending between the upright member and each of the legs for an additional support of the stand.

Further objects and features of this invention will be apparent from the following specification and the drawing in which:

FIG. 1 is a perspective view of a collapsible stand embodying the invention;

FIG. 2 is a vertical section through the stand; and

FIG. 3 is a sectional view taken generally along the line 3—3 of FIG. 2.

While an illustrative embodiment of the invention is shown in the drawing and will be described in detail herein, the invention is susceptible of embodiment in many different forms and it should be understood that the present disclosure is to be considered as an exemplification of the principles of the invention and is not intended to limit the invention to the embodiment illustrated. The scope of the invention will be pointed out in the appended claims.

Referring now to the drawing, more specifically to FIGS. 1 and 2, there is shown a stand generally designated 10. A hollow elongate cylindrical tube member 11 has three relatively short downwardly oriented projections or studs 12 welded to its outer surface at 13. Three leg members 15, made of hollow elongate cylindrical tubes, are slidably fitted over these welded stud projections 12 on the member 11. Bolts 16 are inserted through holes in the lower portion of the leg members 15. The bolts 16 are formed with eyelets 18 at their inner ends. The bolts 16 are provided with wing nuts 19 at their outer ends. A chain 20 is passed through the eyelets 18 of each bolt of the leg members 15. S hooks 21 are inserted through the holes 22 into the lower part of the tube member 11, the hooks 21 receiving and supporting the chain 20 as it is stretched between the respective eyelets 18 of the leg members 15. After the chain 20 is connected to the S hooks 21 the bolts 16 are tightened to the leg members 15 by the wing nuts 19.

The chain which interconnects the respective leg members 15 and the hooks 21 of the tube member 11 acts as a brace for the leg members 15 with respect to the tube member 11 and furnishes the stand an additional support. The arrangement of the chain 20 with respect to the leg members 15 and the tube member 11 can best be seen in FIG. 3.

To assemble the stand, the leg members 15 are slidably fitted over the stud projections 12 on the tube member 11. Bolts 16, which have a chain 20 threaded through the eyes 18, are inserted through the holes in the lower portions of the leg members 15 and capped with the wing nuts 19 to prevent the bolts 16 from slipping out of the leg members 15. Three S hooks 21 are inserted through the holes 22 in the bottom portion of the tube member 11. The sections of the chain 20 extending between each pair of leg members 15 are then placed over the exterior portions of the S hooks 21 and the chain 20 is stretched by tightly securing the bolts 16 in the leg members 15 by tightening the wing nuts 19.

A hollow elongate cylindrical tube member 24 is inserted downwardly into the member 11 and is slidable therein. The tube member 24 has a number of holes 25 formed along its length so that it can be adjusted for proper height inside the tube member 11. When the proper height has been selected, a hole 25 of the tube member 24 is matched with a hole 26 on the tube member 11 and a bolt 27 is inserted to secure the members 11 and 24 together. The bolt may be held by a wing nut 29. As best seen in FIG. 2, the tube member 24 has an interior sleeve 31 at its top to receive a threaded bolt 32 holding a block 34 to which a work holding device such as a saddle 35 is attached for support of a pipe P or the like (FIG. 1). A handle 36 is mounted on the bolt 32 to adjustably support said bolt 32 in the sleeve 31.

To disassemble the stand, the wing nuts 19 are loosened to remove bolts 16 from the leg members 15. This releases the tension of the chain 20 so that the chain 20 can be removed from the "S" hooks 21. The three leg members 15 are pulled from the stud projections 12 of the tube member 11. The wing nut 29 is loosened and removed from the bolt 27 and the bolt 27 is pulled out of the member 11 to facilitate the removal of the tube member 24 out of the tube member 11. The threaded bolt 32 holding the block 34 with the saddle 35 is then removed from engagement with the sleeves 31 of the tube member 24 by rotating handle 36 to unscrew said bolt 32. The block 34 can then be brought out of engagement with the threaded bolt 32 by unscrewing said block 34 from the bolt 32.

As can be seen from the above description, it is possible to completely disassemble the stand since every part, with the exception of the stud projections 12 welded to the exterior of the tube member 11, can be removed from the part to which it is attached.

The parts so disassembled can be placed in a tradesman's carrying case for taking them to another job location or can be stored in an ordinary workshop requiring but a minimum of space.

I claim:

1. A collapsible stand comprising, an upright member, at least three legs secured to said upright member above the lower end thereof and extending outwardly and downwardly therefrom the lower ends of said legs being below the lower end of said upright member, and flexible elongated brace means interconnecting each of said legs and said upright member for bracing said legs with respect to said upright member and each leg with respect to adjacent legs.

2. The collapsible stand of claim 1 wherein said flexible brace means comprises a chain portion having its ends connected to a pair of adjacent legs and secured intermediate its ends to said upright member.

3. The collapsible stand of claim 1 in which the legs are nonrigidly secured to the upright member.

4. The collapsible stand of claim 3 in which each of said legs has an upper end portion telescoped with a cooperating surface of said upright member.

5. The collapsible stand of claim 4 wherein said flexible brace means has a portion extending between each pair of adjacent legs and secured intermediate the legs to said upright member, said brace means being under tension pulling said legs inwardly and stabilizing said upright member.

6. The collapsible stand of claim 5 wherein said flexible brace means is removably secured to said upright member.

References Cited by the Examiner

UNITED STATES PATENTS

| | | | |
|---|---|---|---|
| 517,211 | 3/1894 | Clarke | 248—163 |
| 1,486,508 | 3/1924 | Weeks | 248—188.91 |
| 2,504,291 | 4/1950 | Alderfer | 254—98 |
| 3,066,958 | 12/1962 | Bergin et al. | 285—61 |

CLAUDE A. LE ROY, *Primary Examiner.*

J. F. FOSS, *Assistant Examiner.*